United States Patent [19]

Kohashi

[11] 4,387,382

[45] Jun. 7, 1983

[54] INK RECORDING APPARATUS

[75] Inventor: Tadao Kohashi, Moriguchi, Japan

[73] Assignee: Matsushita Electric Industrial Co., Ltd., Kadoma, Japan

[21] Appl. No.: 307,511

[22] Filed: Sep. 30, 1981

[30] Foreign Application Priority Data

Oct. 7, 1980 [JP] Japan ................................ 55-140986
Nov. 26, 1980 [JP] Japan ................................ 55-166944

[51] Int. Cl.³ .......................................... G01D 15/18
[52] U.S. Cl. ............................................ 346/140 R
[58] Field of Search ........ 346/140 R, 140 IJ, 140 PD, 346/1.1

[56] References Cited

U.S. PATENT DOCUMENTS 3,375,528  3/1968  Klavsons et al. ............ 346/140 PD
3,800,699  4/1974  Carley ......................... 346/140 R X
4,293,866  10/1981  Takita et al. ................. 346/140 PD

FOREIGN PATENT DOCUMENTS 54-136831  10/1979  Japan ............................ 346/140 PD
55-28818   2/1980   Japan ............................ 346/140 PD Primary Examiner—Donald A. Griffin
Attorney, Agent, or Firm—Cushman, Darby & Cushman

[57] ABSTRACT

An ink recording apparatus of low voltage operation, wherein by utilizing an electroosmotic phenomenon of the fluid ink with respect to the solid state dielectric substance substrate, the amount of the fluid ink deposited on the surface of the ink transfer body is electrically controlled in sequence by means of electric signals $V_C$, $V_C'$ applied across the recording electrode and ink transfer body, and this controlled deposited ink is retained on the surface of the ink transfer body and rotated, and then transferred and deposited onto the recording medium, thereby an ink picture is recorded and reproduced on the recording medium.

39 Claims, 8 Drawing Figures

INK RECORDING APPARATUS

BACKGROUND OF THE INVENTION

1. Field of the Invention

The present invention relates to a recording apparatus which utilizes an electroosmotic phenomenon of a fluid ink with respect to a solid state dielectric substance member.

2. Prior Arts

Several proposals have been made by the inventor of the present invention as to the recording methods and apparatuses based on the above-mentioned principle.

One of them is the known coulomb force method, wherein a fluid ink makes an electroosmotic travelling to form an ink protrusion with respect to a dielectric substance substrate responding to signal voltage and this ink protrusion is caused to fly and deposit onto a recording medium by means of coulomb force. Another one is the known direct transfer method, wherein the above-mentioned ink protrusion is directly transferred and deposited onto the recording medium, thereby an ink picture corresponding to signal voltage is recorded and reproduced.

However, these recording methods have problems to be further improved.

That is to say, in the coulomb force method, an apparatus becomes expensive and complicated because of the requirement for high voltage, and in the direct transfer method, since the recording medium is brought in contact directly with a recording head, the recording head wears out or is adhered with dust, resulting in an unstable operation, and also the resolution of recording is liable to deteriorate due to the ink blur, which is a phenomenon that ink spreads in excess on a recording medium.

SUMMARY OF THE INVENTION

The present invention purposes to provide a recording apparatus which is further improved from the technical standpoint.

An ink recording apparatus in accordance with the present invention is based on a principle that the amount of fluid ink deposit onto the surface of an ink transfer body is electrically controlled in sequence responding to the signal voltage to be applied by utilizing an electroosmotic travelling of fluid ink with respect to a solid state dielectric substance member (hereinafter simply referred to as dielectric substance substrate) to obtain an ink pattern, and this controlled ink deposit of the pattern is retained on the surface of the above-mentioned ink transfer body, and then this retained ink deposit is transferred and deposited onto a recording surface of the recording medium from the above-mentioned ink transfer body, thereby an ink picture corresponding to the above-mentioned signal voltage is recorded and reproduced on the recording surface.

In the present invention, the term "fluid ink" is defined as a colored body wherein a dye or a pigment is dissolved or suspended in a liquid together with a furfactant, charge controlling agent, binder (vehicle) material, or the like as required, and whose form is a colored material with fluidity, irrespective of solution or colloid.

Also, the term "electroosmosis" is a general designation of the interfacial electrokinetic phenomenon that, when a solid state dielectric substance substrate and a liqueous substance are contacting with each other, electric double layers are formed at their boundary surface, and the liqueous substance moves in relation to the solid state substance when a voltage is applied, and when the solid state dielectric substance substrate is of nonporous substance, the liqueous substance moves on the surface thereof, and moves through one or both of the surface and inside thereof when it is of porous substance.

DESCRIPTION OF PREFERRED EMBODIMENTS

Figure 1:
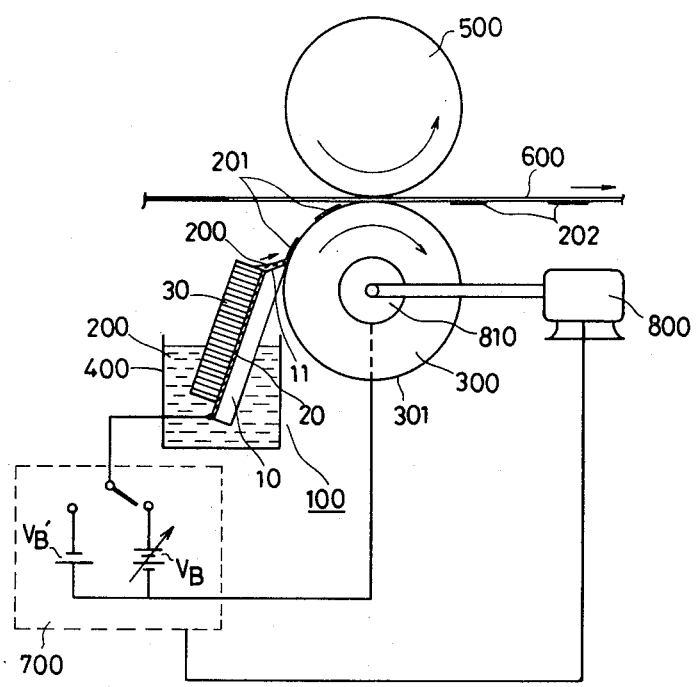
FIG. 1 is a view showing a cross-sectional structure and a power supplying system of the first embodiment of a recording apparatus in accordance with the present invention.

FIG. 1, a view showing a cross-sectional structure and a power supplying system of the first embodiment of ink recording apparatus in accordance with the present invention.

In the view, 100 is a recording head, 200 is a fluid ink, 300 is an ink transfer body which works as a transferring electrode, 400 is an ink bath as an ink feeding means, 500 is a pressure contact roller, 600 is a recording medium on which picture is to be recorded with an ink, such as paper or the like, and 700 is a signal voltage source.

The recording head 100 comprises a dielectric substance substrate 10 whose one of end parts 11 is in contact with the ink transfer body 300 and makes the fluid ink to travel electroosmotically, a recording electrode 20 which is attached to the surface of the dielectric substance substrate 10 and is insulated from the ink transfer body 300 through the thickness of the dielectric substance substrate, and a spongy body 30 disposed on the recording electrode which is impregnated with the fluid ink 200 and feeds the ink 200 to one of end parts 11. A part of this assembly is immersed into the fluid ink 200 in the ink bath 400 as ink feeding means, and the fluid ink is fed to the end part 11 of the dielectric substance substrate 10 by means of capillary phenomenon of the spongy body 30. The ink transfer body 300 is made of a metallic column or cylinder, and is moved by a known driving means such as pulse motor or the like. The ink transfer body 300 pairs with the recording electrode 20, thereby also serves as a transferring electrode which is the other electrode for applying a voltage to the fluid ink 200 on the end part 11.

The recording electrode 20 and the ink transfer body 300 are connected to the signal voltage source 700, and the ON voltage $V_B$ and the OFF voltage $V_B'$ are applied across them as signal voltage. The signal voltage and the driving of the ink transfer body 300 is synchronized in any of the examples hereinafter, so that two dimensional patterns are produced by means of the electric signal.

Substances for the dielectric substance substrate 10 and the fluid ink 200 are determined in view of the correlation of electroosmosis with the fluid ink 200.

For instance, when a boro-silicate glass plate or a cellulose acetate film is employed for the dielectric substance substrate, the fluid ink 200 which makes a good electroosmotic travelling in the direction toward a negative electrode with respect to this dielectric substance substrate can be constituted in such a manner that, for instance, a dye or a pigment such as a mixture of Macrolex Blue FR (trade name of Bayer Japan Ltd.) and Oil Red XO (trade name of Kanto Chemical Co. Inc. of Japan) for black ink, Macrolex Blue RR (trade name of Bayer Japan Ltd.) for blue series ink, Ceres Yellow 3G (Bayer Japan Ltd.) for yellow series ink, or the like is mixed into a liqueous substance comprising, for instance, γ-methacryloxy-propyltrimethoxy-silane as a colorant by the weight ratio of about 1 to 4% together with a binder agent, charge controlling agent, surfactant agent, or the like as required to form the oil-soluble ink (or solvent ink) 200.

Although, the fluid ink 200 can be constituted also in a water-color ink type, this type is subject to electrolysis, therefore the oil-soluble ink is more useful.

Furthermore, contrary to the above-mentioned example, the fluid ink 200 which makes an electroosmotic travelling in the direction toward a positive electrode can be constituted by using an organic solvent such as, for instance, phenyl-triethoxy-silane or tetrahexyl-silicate in place of the liqueous substance in the above example.

For the dielectric substance substrate 10, a flexible substance such as a sheet or film of cellulose acetate or cellulose nitrate or the like is preferable to bring in good contact with the ink transfer body 300. Furthermore, to deposit the fluid ink 200 onto the surface of the ink transfer body 300 with good precision, it is preferable that the contacting end part 11 is tapered, and its tip is brought in contact with the surface of the ink transfer body 300, and the surface of the ink transfer body is rotated in such a direction that it goes away from the tip, as exemplified in the view. The installation range of the end part is set in such a manner that the contacting surface of the end part 11 makes an acute angle with the surface tangential to the surface of the transfer body 300 at the contacting point, as exemplified in the view. The above-mentioned configuration is preferable for an ink transcription of high precision.

For the above-mentioned fluid ink 200, polyurethane foam is suitable for the substance for the spongy body.

The recording electrode 20 is formed by coating a metal oxide film such as tin oxide, indium oxide or its solid solution, a metallic film such as copper or the like, or a conductive paint such as graphite or the like.

The press contact roller 500 is formed by covering the surface of a metallic cylinder or column or the like with rubber or the like, and adjust the contacting pressure of the recording medium 600 against the ink transfer body 300.

Hereinafter, elucidation is made on the recording method and operation of apparatus in reference to the case where a substance making an electroosmotic travelling in the direction toward a negative electrode is used as the fluid ink 200.

In the view, the ON voltage $V_B$ which is a negative high voltage signal with respect to the recording electrode is applied to the ink transfer body 300 forming a transferring electrode from the signal voltage source 700. Since the fluid ink 200 makes electroosmotic travelling in the direction toward a negative electrode, it travels on the surface of the end tip 11 of the dielectric substance substrate 10 as shown by the arrow mark in the view, finally being fed onto a surface 301 of the ink transfer body to produce an ink deposit 201. This amount of deposit depends upon the amount of electroosmotic travelling of the fluid ink 200, therefore this amount increases with increase in the amplitude and pulse width of the ON voltage $V_B$.

On the other hand, when the OFF voltage $V_B'$ which is of reverse polarity to the above-mentioned ON voltage $V_B$, and preferably of smaller maximum amplitude and pulse width than those of the $V_B$ is applied from the signal voltage source 700, the recording electrode 20 forms a negative electrode with respect to the ink transfer body 30 by applying this $V_B'$, therefore the fluid ink 200 makes an electroosmotic travlling in the direction reverse to that shown by the arrow mark in the view, that is, toward the recording electrode 20 side, thereby the ink deposit onto the ink transfer body surface 301 is promptly stopped or prevented.

A stop of electroosmotic travelling can also be made by setting to $V_B'=0$, but in this case, the electroosmotic travelling trails due to the inertia under $V_B$ application or due to a presence of the fluid tank 200 on the surface of the end part 11, thereby the resolution of an ink image is liable to be deteriorated. When a proper $V_B'$ of reverse polarity is applied as mentioned above, an advantage is obtainable that these drawbacks can be prevented, thereby a clear and crisp recording can be made.

The ON voltage $V_B$ is amplitude-modulated or pulse-width-modulated corresponding to the concentration of input information to be recorded. In this case, by selecting the OFF voltage at a proper small constant value as mentioned above ($V_B'=0$ or smaller), the following advantage is obtainable, that is, the deficiency that the fluid ink 200 travels to the recording electrode 20 side in excess, thereby delays a rise of electroosmotic travelling by the ON voltage application or the like can be prevented.

Thus, when the ON voltage $V_B$ which is signal voltage is synchronized with the OFF voltage $V_B'$, thereby a rotation drive power source 800 is controlled to drive a motor attached to the rotary shaft of the ink transfer body 300, thereby the ink transfer body 300 is rotated at a constant speed or in a pulsed motion, an ink pattern by means of controlling the amount of ink deposit is obtained on the ink transfer body surface 301, and the ink deposit 201 is formed in its rotary direction with application of the ON voltage $V_B$, but no ink deposit 201 is formed with application of the OFF voltage $V_B'$.

Accordingly, the ink deposit 201 is transferred to form an ink transcription 202 onto the surface of the recording medium 600 such as paper or the like passing through between the pressure contact roller 500 and the ink transfer body 300, thereby an ink picture corresponding to the signal voltages $V_B$ and $V_B'$ from the signal voltage source 700 can be recorded and reproduced.

The property of the ink transfer body 300 is deeply associated with the quality of recorded picture. Substances which get wet well with the fluid ink 200 to be used, substances which repel it and the like can be employed respectively by constituting them properly.

The fluid ink 200 in the present embodiment is an oil soluble ink, and for instance, metals which well get wet with it, namely, oilphilic (i.e. oleophilic or ink-philic) metals include copper, brass and the like, and conversely, metals which do not get wet so well with or repel the oil soluble ink, namely, oil repellent (in other word, ink-phobic) metals include chromium, nickel, zinc, and the like.

Besides the above-mentioned substance, an anti-outflow coating agent of insulating property wherein a fluorine polymer is dissolved into a fluorine solvent (for instance, FLUORAD FC-721, trade name of 3M of USA) and the like, which are hydrophobic and at the same time oleophobic, can be used as the ink-repellent substances.

When an ink-philic metal is employed for the ink transfer body 300, the deposited ink 201 sometimes blurs or flows out. To prevent such trouble, an oil-repellent metal is plated, or an oil repellent metal is plated, for instance, in mesh shape of about 100 to 400 lines/inch, or an oil-repellent is coated on the surface of this ink transfer body.

An oilphilic metal between mesh lines is exposed in a dot shape, thereby the dot-shaped ink accommodating part is formed, and the ink deposit is formed on this part limitedly, therefore ink blur or ink outflow can be prevented. The density of these mesh dots determines the resolution of a recorded picture. When the ink transfer body is made of an oil repellent metal, the above-mentioned mesh dots are dispensed with, thereby a structured is simplified, however, a consideration must be taken on giving a moderate ink-adhesive-force so as not to repel the ink excessively. In general, the above-mentioned method which gives an oil repellent property in mesh shape on an oilphilic metal is an excellent method for the configuration of the ink transfer body 300.

A plural number of recording electrodes are disposed in the direction of depth of the drawing while insulated from one another, and signal voltages such as $V_B$, $V_B'$ and the like are selectively applied across these recording electrodes 20 and the ink transfer body 300 respectively from the signal voltage source 700, and thus scanning is performed, thereby a two-dimensional picture recording can be made. The arrangement pitch of the recording electrodes 20 determines the resolution of a recorded picture. Normally, the density of arrangement of the recording electrodes 20 is selected at, for instance, about 4 to 8 lines/mm. As mentioned above, in the case where the mesh-shaped dots are formed on the surface of the ink transfer body 300, when the pitch of the recording electrodes 20 is selected equally to or integer-fold that of the net dots so that a singular or plural mesh dots that is, dot-shaped ink accommodating parts, will be positioned corresponding to the recording electrodes 20 respectively, an ink blur or interference on the surfaces 301 between the recording electrodes 20 adjoining to one another can be prevented.

For the electroosmotic mobility of the fluid ink 200, normally, a value of about $10^{-6}$ to $10^{-4}$ cm$^2$/V.sec is obtainable when the effective electroosmotic travelling distance L from the recording electrode 20 to the contacting point on the surface 301 of the ink transfer body 300 which is a transferring electrode (the end part 11 in the present embodiment) is expressed in cm, applied voltage in volt and time in second.

The voltage can be applied up to about 2 V/$\mu$m maximum (that is, $2 \times 10^4$ V/cm), therefore when a high mobility of fluid ink 200 is used, an electroosmotic travelling of about 2 cm/sec can be made. An ink transcription of one dot requires an electroosmotic travelling of about 10 $\mu$m empirically, and a high speed recording of about $10^3$ dots/sec, about $10^3$ lines in the line sequential scanning, becomes available. In addition, L is normally selected at about 20 to 150 $\mu$m, therefore the maximum amplitude of the ON voltage $V_B$ becomes about 40 to 300 V, being far lower than that in the case of coulomb force method. Furthermore, the ink transfer body 300 itself also serves as an electrode for voltage application, therefore an ink dispersion is smaller in comparison with the case with ink-jet method or the like, thereby a high quality of ink recording with small and crisp dots of converging property can be made. In addition, since the ink transfer body 300 contacts with the recording medium 600, an advantage is obtainable that the operation is more stable in comparison with the direct transfer method wherein the recording medium contacts directly with the recording head.

Figure 2:
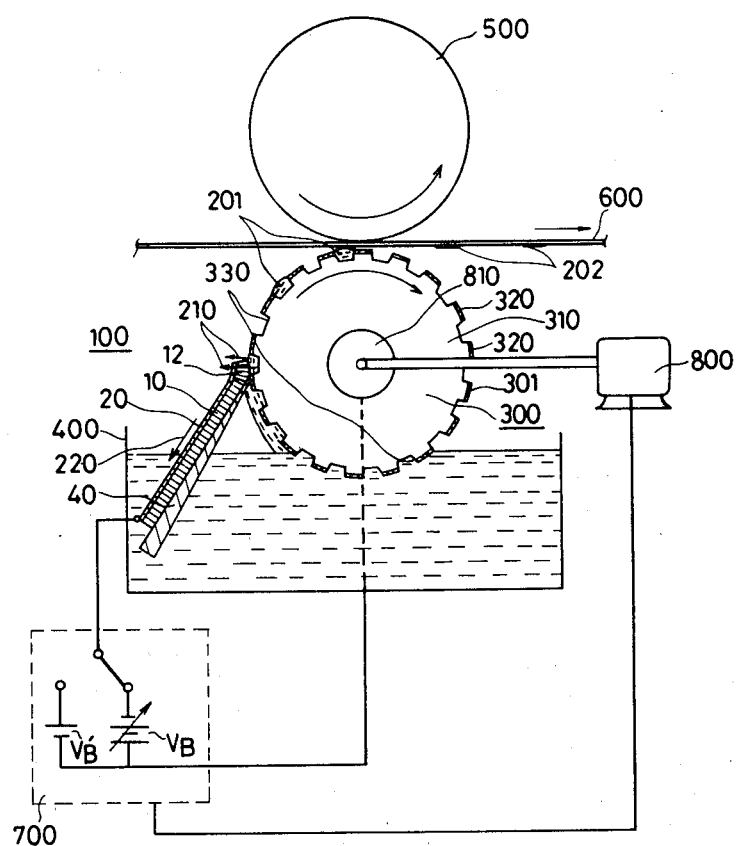
FIG. 2 is a view showing a cross-sectional structure and a power supplying system of a recording apparatus of the second embodiment in accordance with the present invention.

FIG. 2 is a view showing a cross-sectional structure and a power supplying system of the second embodiment of a recording apparatus in accordance with the present invention.

The present embodiment is the case where the ink deposited on the ink transfer body surface is attraction-controlled.

The ink transfer body 300 comprises a column-shaped or cylinder-shaped rotary body, and a coating 320 is formed by plating an oil repellent metal such as chromium, zinc or the like on a column-shaped or cylinder-shaped base body 310 of oilphilic metal such as copper, brass or the like, and a net dot etching is applied on the surface of the coating 320 by employing a cross-line screen or backstein screen or the like which is used for a normal gravure process, thereby a dot-shaped ink accommodating part 330 penetrating to the base body 310 is formed.

The number of screen mesh, that is, the number of lines per inch of the dot-shaped ink accommodating part 330, is selected for instance, at 100 to 400, and its depth and hole diameter are nearly uniform respectively, for instance, the depth at 5 to 20 $\mu$m, and the ratio of the area occupied by the hole on the surface of the ink transfer body to the area of coating 1 remaining unetched is selected at about 1 to 3. For instance, a part of lower part of the ink transfer body 300 is immersed into the ink bath 400 accommodating the fluid ink 300 which makes an electroosmotic travelling in the direction toward a negative electrode as mentioned above. For a dielectric substance substrate, a porous substance substrate with fine pores and gaps penetrating substantially in the direction of thickness such as sintered fine glass balls, filter comprising glass fiber, microporous membrane filter comprising a plastic material or the like is preferable.

Particularly for the fluid ink as described in FIG. 1, for instance, a microporous membrane filter comprising cellulose acetate and having a thickness of 20 to 150 μm, a mean pore diameter of 0.1 to 8 μm, and a porosity of about 60 to 80% is flexible, thereby suitable for the dielectric substance substrate 10 in the present embodiment.

This flexible porous dielectric substance substrate 10 is adhered to a supporting substrate 40 of insulating property forming a doctor blade by thinly sharpening the tip and contacting with the surface 301 of the ink transfer body 300. An end part 12 of the dielectric substance substrate protrudes beyond the supporting substrate 40 to some extent, and the extended part of surface thereof of the supporting substrate 40 side is curved and contacts with the surface 301. On the surface of the dielectric substance substrate 10 of opposite side to the supporting substrate 40, the recording electrodes 20 permeable to the fluid ink 200 are formed by thinly coating a conductive paint such as graphite or the like. In addition, the recording electrodes are coated to the edge of the end part 12, however, an area of slight distance should be left uncoated between the edge of the end part 12 and the tips of the recording electrodes 20 (for instance, about an arrangement pitch of the dot-shaped ink accommodating part 330) to prevent the recording electrodes 20 from contacting directly with the surface 301 of the recording electrodes 20. Furthermore, the recording electrodes 20 may be installed on the surface whereto the dielectric substance substrate 10 is attached of the supporting substrate 40 while retracting with an area of slight length left between the contacting point of the surface 301 and the tips of the recording electrodes 20 (for instance, about the arrangement pitch of the dot-shaped dents or ink acommodating parts 330). In any case, the route of electroosmotic travelling of the fluid ink 200 is formed from the recording electrodes 20 to the dot-shaped dents or ink accommodating parts 330 through the end part 12.

The other end side of the recording head 100 is immersed into the fluid ink 200 in the ink bath 400.

The base body 310 forming the recording electrodes 20 and the transferring electrodes are connected to the signal voltage source 700 respectively.

Elucidation is made on the operation in the case where the fluid ink 200 making an electroosmotic travelling in the direction toward a negative electrode in reference to the apparatus as shown in FIG. 2, like the case in FIG. 1. When the ink transfer body 300 rotates as shown by the arrow mark in the figure in synchronization with picture signal switching the ON voltage $V_B$ and the OFF VOLTAGE $V_B'$, the fluid ink 200 is deposited at the dot-shaped ink accommodating part 300 and the coating 320 immersed into the fluid ink 200. Among them, the fluid ink 200 on the surface of the coating 320 is scraped by the supporting substrate 40 also serving as a doctor blade, thereby the fluid ink 200 is deposited and accommodated in the ink accommodating part 330 alone. That is to say, the amount of ink deposited on the surface 301 is unified. When the ON voltage $V_B$ negative with respect to the base body 310 is applied to the recording electrode 20 in this state, the fluid ink 200 in the dot-shaped ink accommodating part 300 is attracted in the direction toward the active tip face of the end part 12 of the dielectric substance substrate 10 contacting with the surface 301 and further in the direction of thickness at the part apart from the end toward the center through the porous dielectric substance substrate 10 and the porous electrodes 20 by means of electroosmosis corresponding to the amplitude or the pulse width, as shown by the arrow marks 210 in the figure. A surplus of the absorbed ink is recovered again into the ink bath 400 by a capillary phenomenon of the dielectric substance substrate 10, as shown by the arrow mark in the figure. Accordingly, the inside of this ink accommodating part 330 becomes vacant corresponding to $V_B$, thereby no ink transcription 202 onto the recording medium 600 is produced.

On the other hand, when the OFF voltage $V_B'$ of reverse polarity to $V_B$ with constant amplitude and constant pulse width is applied, the above-mentioned ink attraction stops instantaneously and the fluid ink tends to make electroosmotic travelling in the direction reverse to the arrow marks 210 in the figure, and when the amplitude and pulse width are large in excess, the fluid ink floods on the surface 301. Therefore, the amplitude and pulse width should be selected at proper small values to make an electroosmotic travelling in a proper degree. That is, in this system, a printed picture element becomes white by the ON voltage $V_B$ and becomes black (or colored when a color ink is used) by the OFF voltage $V_B'$.

Furthermore, since the coating 320 has an oil repellent property, it repels the fluid ink impregnated into the porous dielectric substance substrate 10, thereby prevents a deposit onto the coating 320. Thus the deposited ink 201 firmly adhered to the oilphilic ink accommodating part 330 is transferred onto the recording medium 600 with rotation of the ink transfer body 300, and the ink transcription 202 is produced, thereby an ink picture with light and shade corresponding to the signal voltage from the power source 700 can be recorded and reproduced. In addition, in this case, when the polarity of electroosmosis of the supporting substrate 40 of insulating property with respect to the fluid ink 200 is reverse to that of the porous dielectric substance substrate 10, the fluid ink 200 travels in the direction toward a positive electrode on the boundary surface between the dielectric substance substrate 10 and the supporting substrate 40, thereby the above-mentioned operation is prevented, resulting in an unstable operation.

Like the porous dielectric substance substrate 10, the supporting substrate 40 causes the fluid ink 200 to make electroosmotic travelling in the direction toward a negative electrode. For instance, the above-mentioned problems can be solved by employing boro-silicate glass or cellulose acetate plate.

In the present embodiment, control of attraction of the deposited ink 201 in the dot-shaped ink accommodating parts 330 independent from one another is performed. For this purpose, the end part 12, particularly its tip edge part is required to be positioned accurately on the dot-shaped ink accommodating part 330. Accordingly, a misoperation can be prevented in such a manner that the ink transfer body 300 is synchronized with signal voltages such as $V_B$, $V_B'$ or the like in view of the arrangement pitch of the ink accommodating parts 330, and a drive motor 810 is energized in a pulse fashion by the rotation control power source 800, thereby the rotation of the ink transfer body 300 is controlled pitch by pitch of the arrangement of the ink accommodating parts 330.

Furthermore, the coating 320 other than the ink accommodating parts 330 can be constituted by coating an oil repellent insulating film instead of constitution with metal.

Coating an oil-repellent such as the above-mentioned fluorine series polymer or the like is its one example, or an insulating film such as cellulose acetate or the like is coated in advance, thereafter the above-mentioned oil-repellent may be coated on it.

Particularly in the latter case, the surface 301 of the ink transfer body is electrically insulated from the recording head with the ink accommodating parts 330 left uninsulated, therefore lines of electric force concentrates on the ink accommodating part 330 in a dot fashion. For this reason, an advantage is obtainable that a misoperation can be prevented, thereby an effective control of attraction of the deposited ink 201 can be made.

A plural number of recording electrodes 20 can be disposed in the direction of depth of paper sheet face while insulated from one another like the case of the embodiment in FIG. 1 in view of the arrangement density of the dot-shaped ink accommodating parts 330.

Furthermore, in the embodiment in FIG. 2, the ink transfer body 300 is raised with the recording head 100 left intact so as not to contact with the fluid ink 200 in the ink bath 400, and the polarities of the ON voltage $V_B$ and the OFF voltage $V_B'$ are reversed, thereby control of feeding the deposited ink 210 can be performed like the case of FIG. 1. Conversely, when the recording head 100 in FIG. 1 is introduced into FIG. 2, an advantage is obtainable that the dielectric substance substrate 10 can control the attraction as a recording head also serving as a doctor blade.

In addition, the end part 12 of the dielectric substance substrate 10 is made longer than the supporting substrate 40, and it is preferable that its length is nearly equal to the arrangement pitch of the dot-shaped ink accommodating parts 300, however, the length can be made more longer as required because the tip edge part of the end part 12 plays a dominant role for an effective ink attraction or feed control.

Figure 3:
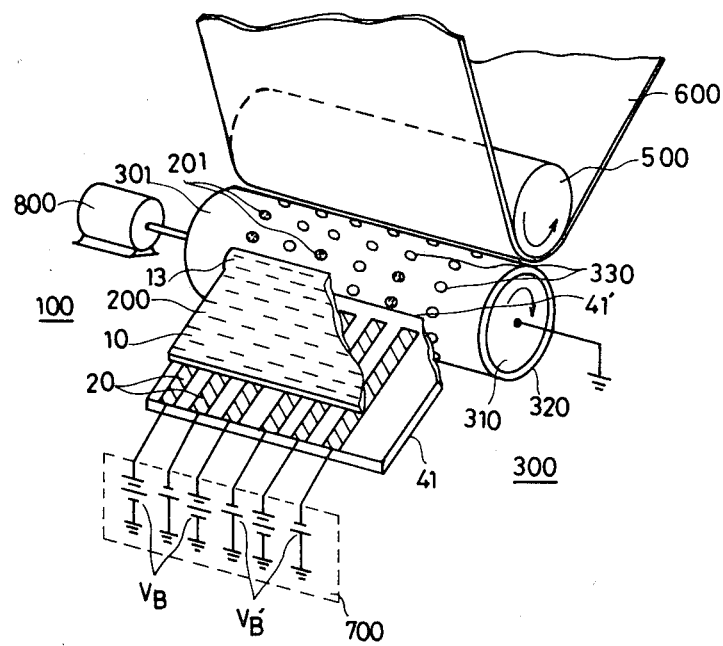
FIG. 3 is a view showing a perspective fragmental structure and a power supplying system of a recording apparatus of the third embodiment in accordance with the present invention.

FIG. 3 is a view showing a perspective fragmental structure and a power supplying system of the third embodiment of a recording apparatus in accordance with the present invention, and exemplifies the case where a plural number of recording electrodes are disposed.

For the porous dielectric substance substrate, a microporous membrane filter such as cellulose acetate or the like is employed, and the fluid ink 200 is fed and impregnated by means of an ink feeding means, for example, an ink tub or ink-leading pipe, but it is omitted from the drawing.

This flexible dielectric substance substrate 10 is attached to the supporting substrate 41 of insulating property whose end edge part 41' contacts with the surface 301 of the ink transfer body 300, and the end part 13 of the dielectric substance substrate 10 extends beyond the end edge part 41' of the supporting substrate 41, and contacts with the surface 301 while curving like the case in FIG. 2.

For instance, boro-silicate glass or cellulose acetate plate is employed so that the supporting substrate 41 will cause an electroosmotic travelling in the same direction of voltage polarity as the dielectric substance substrate 10 with respect to the fluid ink 200.

In this embodiment, since the recording electrodes 20 . . . are insulated respectively and a plural number of them are disposed on the non-porous dielectric substance substrate 41, they do not expand or contract in comparison with the case where disposed on the surface of the porous dielectric substance substrate 10, therefore the recording electrodes 20 can be constituted with a far higher precision. The respective recording electrodes are disposed with a length left between the end edge part 41' of the dielectric substance substrate 10 respectively, thereby a contact with the surface 301 is prevented, and also the route of electroosmotic travelling of the fluid ink 200 is formed to the dot-shaped ink accommodating parts 330 contacting with the recording electrodes 20 . . . through the end part 13.

In the ink transfer body 300, the covering 320 of oil repellent metal or of insulating property is coated on the base body 310 comprising an oilphilic metal, and the dot-shaped ink accommodating parts 330 reaching the base body 310 are regularly disposed corresponding to the respective recording electrodes 20.

A substance making an electroosmotic travelling in the direction toward a negative electrode as mentioned above is used for the fluid ink 200, and the respective ON voltage $V_B$ and OFF voltage $V_B'$ are applied in a line sequential scanning manner as shown in the figure, and the ink transfer body 300 is rotated in synchronization with these voltages, thereby the deposited ink 201 is fed into the dot-shaped ink accommodating part 330 and controlled corresponding to the signal voltage by means of electroosmotic travelling through the end part 13, thus an ink picture can be recorded and reproduced on the recording medium 600.

As shown in FIG. 2, when the ink transfer body 300 and the recording head 100 is immersed into the fluid ink in the ink bath and the polarities of $V_B$ and $V_B'$ are reversed, control of attraction and reduction of the deposited ink 201 can be performed.

Figure 4:
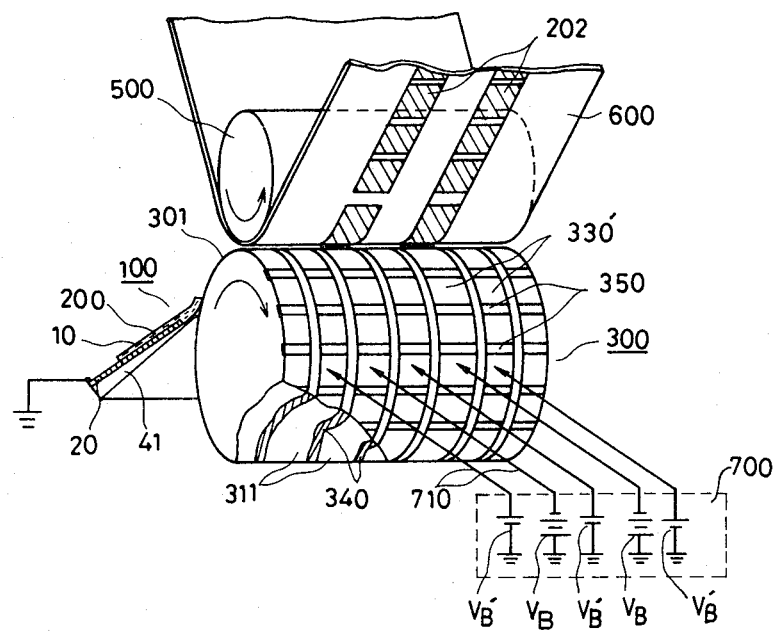
FIG. 4 is a view showing a perspective fragmental structure and a power supplying system of a recording apparatus of the fourth embodiment in accordance with the present invention.

FIG. 4 is a view showing a perspective fragmental structure and a power supplying system of the fourth embodiment of a recording apparatus in accordance with the present invention, and this embodiment exemplifies the case of configuration with plural transferring electrodes.

The ink transfer body 300 is constituted in such a manner that disk-shaped transferring electrodes 311 comprising an oilphilic metal disk such as brass or the like are insulated from one another with a disk-shaped insulator 340 such as polyester film on the like sandwiched inbetween, and then laminated and adhered.

On the surface 301 of the ink transfer body, an oil repellent 350 of high resistance or of insulating property is coated on the exposed surface of the insulators 340 and the exposed surface of the transferring electrodes 311 in a strip fashion with a constant pitch, and oilphilic dot-shaped ink accommodating parts 330' are formed regularly.

The above-mentioned recording head 100 having the recording electrodes 20 is disposed in contact with the ink transfer body surface 301. On the exposed surfaces of respective transferring electrodes 311 on the ink transfer body surface 301 opposite with respect to the press contact roller 500 with the recording medium 600 sandwiched inbetween, brush electrodes 710 in contact with them are disposed, and are connected to the signal voltage source 700 together with the recording electrodes 20, and the signal voltage comprising the ON voltage $V_B$ and the OFF voltage $V_B'$ is selectively applied in a line sequential fashion. The fluid ink is fed onto the recording electrode by means of an ink feeding means for example, an ink tub or ink-leading pipe, but it is omitted from the drawing.

When the fluid ink 200 makes an electroosmotic travelling in the direction toward a negative electrode, the fluid ink 200 is fed and deposited into the dot-shaped ink accommodating parts 330' of the transfer electrode 311 whereto the ON voltage $V_B$ is applied, but on the parts whereto the OFF voltage $V_B'$ is applied, no fluid ink is deposited.

Accordingly, by rotating the ink transfer body 300 in synchronization with signal voltage, the ink transcription 202 is produced on the recording medium 600, thereby a two-dimensional ink picture can be recorded and produced.

Control of attraction and reduction of the fluid ink 200 can be performed likewise by immersing a part of the ink transfer body 300 and the recording head 100 into the fluid ink 200 and selecting the polarities of $V_B$ and $V_B'$ inversely, like the case in FIG. 2.

Unlike the embodiments in FIGS. 1-3, in the present embodiment, potentials of the transferring electrodes themselves forming the ink transfer body 300 and producing the ink deposit thereon are varied by the signal voltage, therefore an advantage is obtained that a high fidelity of amount control of deposited ink can be made. Furthermore, like the case in FIG. 3, when a plural number of recording electrodes 20 is disposed corresponding to the transferring electrodes 311 and signal voltage is also applied to the respective recording electrodes 20, and the potentials of the recording electrodes 20 are also changed independently from one another simultaneously with the change in each potential of the transferring electrodes 311 due to picture signal, an advantage is obtainable that an ink transfer recording of far higher precision can be carried out.

When an oil repellent substance is used for the respective insulators 340, coating of the oil-repellent 350 on their exposed surfaces can be omitted.

Furthermore, the hollow-cylinder-shaped ink transfer body 300 is formed by employing doughnut-shaped disks respectively for the insulators 340 and the transferring electrodes 311, and voltage can be supplied to the transferring electrodes 311 from the inside of this cylinder by contacting the brush electrodes therewith respectively.

Furthermore, the thin-film-shaped transferring electrodes 311 are formed by means of coating by utilizing an etching technique on the surface of a column- or cylinder-shaped insulator, and then the oil-repellent 350 is coated, thereby the dot-shaped ink accommodating part 330 can be formed.

Figure 4A:
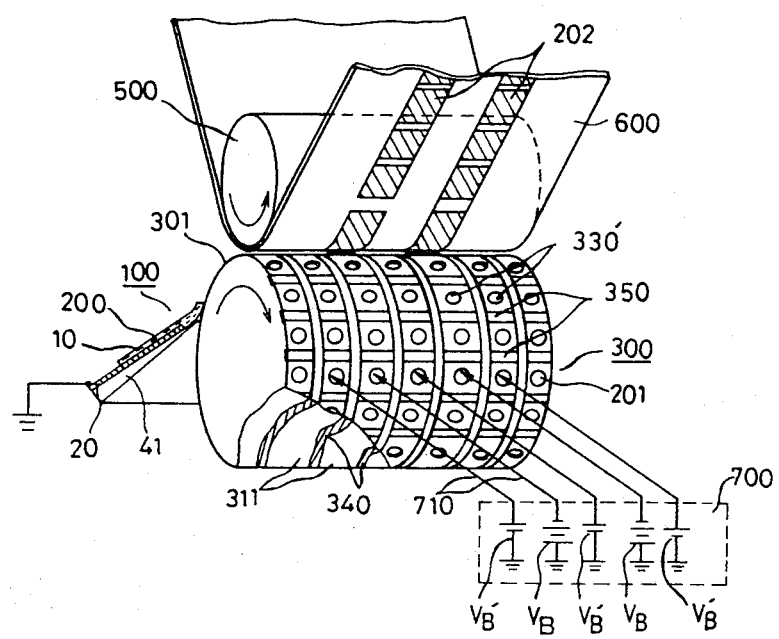
FIG. 4A is a view showing a perspective fragmental structure and a power supplying system of a recording apparatus of a modified example of the fourth embodiment.

In addition, as shown in FIG. 4A the exposed surface of the transferring electrodes 311 may be provided with chemically etched dents of nearly equal diameter (preferably equal to or somewhat smaller than the transferring electrode 311) and nearly equal depth, in order that an advantage of increasing the accommodating capacity can be achieved.

The above description is made centering on the case where the fluid ink makes an electroosmotic travelling in the direction toward a negative electrode with respect to the dielectric substance substrate, and in the case where an electroosmotic travelling is made in the direction toward a positive electrode, needless to say, operation is performed likewise by reversing the polarity of signal voltage.

In addition, description is made on the rotary body for the ink transfer body in this elucidation, however, even when the ink transfer body is of a flat plane shape, for instance, of a disk shape or of a belt shape, this method can be embodied likewise by moving this in relation to the recording head in synchronization with signal voltage.

A modification may be made such that the oil repelling stripes 350 . . . are made tilted from those of FIG. 4.

The above-mentioned embodiments are of the indirect transfer recording methods and apparatuses wherein the fluid ink makes an electroosmotic travelling through the dielectric substance substrate which is combined with one electrode by utilizing the ink transfer body as the other electrode, and the amount of ink deposited on the surface of the ink transfer body controlled by means of signal voltage. These apparatuses operate stably with high precision at a low voltage. Furthermore, a modern color printing apparatus superseding the conventional gravure printing method can be constituted by combining a pluraly number of above-mentioned apparatuses and using the fluid inks of different colors respectively.

Figure 5:
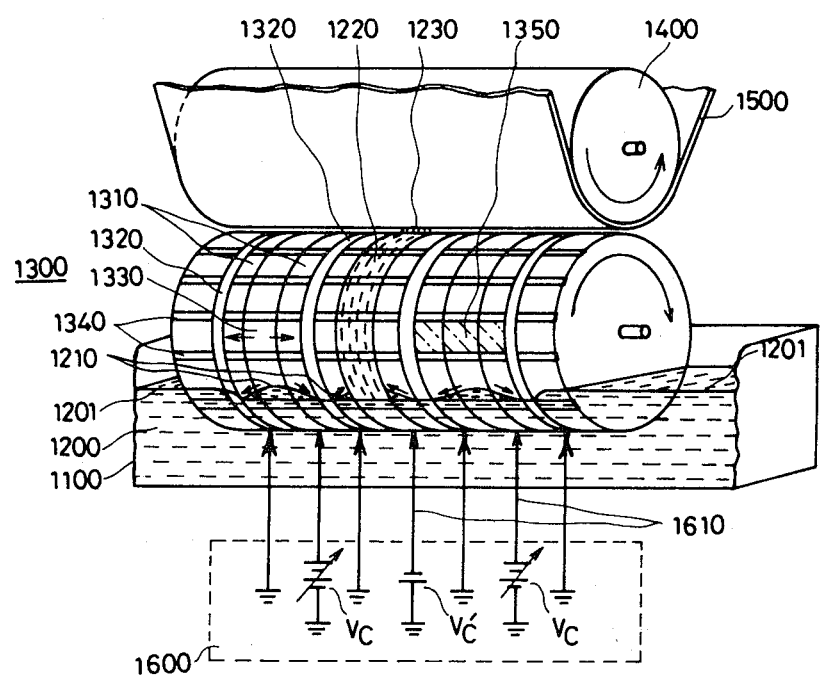
FIG. 5 is a view showing a perspective fragmental structure and a power supplying system of a recording apparatus of the fifth embodiment in accordance with the present invention.

FIG. 5 is a view showing a perspective fragmental structure and a power supplying system of the fifth embodiment of a recording apparatus in accordance with the present invention.

In the figure, 1100 is an ink bath which is an ink feeding apparatus, 1200 is a fluid ink, 1300 is an ink transfer body, 1400 is a press contact roller, 1500 is a recording sheet which is a recording medium such as paper or the like to be ink-recorded, and 1600 is a signal voltage source.

The ink transfer body 1300 is a column- or cylinder-shaped rotary body, and has a solid state dieletric substance substrate 1310 causing the ink fluid 1200 to travel electroosmotically, an auxiliary electrode 1320 which is isolated by this dielectric substance substrate 1310 and applies the signal voltages $V_C$ and $V_C'$ to the dielectric substance substrate 1310 from the signal voltage source 1600, and a transferring electrode 1330 on the surface thereof. The ink transfer body 1300 is partly immersed into the fluid ink 1200 in the ink bath 1100, and a wet front 1210 is formed on the surface thereof in contact with this ink surface 1201.

This wet front 1210 relatively moves on the surface of the ink transfer body by the rotation of the ink transfer body 1300 in the direction shown by the arrow mark in the figure.

Substances for the dielectric substance substrate 1310 and the fluid ink 1200 are selected in the same manner as described in detail in FIG. 1 in view of the electroosmotic property of the fluid ink 1200 with respect to the dielectric substance substrate 1310.

The solid state dielectric substance substrate 1310 can also be made in a hollow cylinder shape besides a column shape.

The auxiliary electrode 1320 and the transferring electrode 1330 are attached to this surface respectively, and can be constituted in a desired shape by etching them. Signal voltage is applied across the above-mentioned electrode 1320 and 1330, and the amount of ink deposited at the wet front on the surface of at least any one of the electrodes 1320 and 1330, and the dielectric substance substrate 1310, that is, the transfer body 1300 can be controlled by means of electroosmotic travelling of the fluid ink 1200 through the dielectric substance substrate 1310. In this case, the surface of the auxiliary electrode 1320 can be constituted so as to have an ink repellent property to repel the fluid ink 1200 to be used substantially, that is, substantially oil-repellent for the oil ink of the above example (water-repellent where the fluid ink 1200 is a water-color ink). While, the surface of the transferring electrode 1330 can be constituted so as to have an ink-philic property to get wet well with the fluid ink 1200 to be used, that is, substantially oil-philic for the oil ink of the above example (hydrophilic where the fluid ink 1200 is a water-color ink).

For instance, oil-philic conductors include copper, brass and the like, and oil-repellent conductors include chromium, nickel, zinc and the like. The oil-repellent conductors also include a clear conductive film comprising tin oxide, indium oxide, or their solid solution in addition to the above. Both oil- and water-repellent insulating materials include, for instance, anti-outflow agents that a fluoride series polymer is dissolved into a fluoride series solvent (for instance, FLUORAD FC-721 trade name of 3M Corporation, USA) and the like.

The ink transfer body 1300 employs, for instance, column- or cylinder-body of boro-silicate glass, cellulose acetate or the like for the dielectric substance substrate 1310, and on the surface thereof the auxiliary electrode 1320 is desirably constituted in such a manner that the above-mentioned ink-repellent conductors are arranged at a pitch of, for instance, 3 to 8 lines/mm, and the width of the conductive part is selected at a value properly narrower than that of the transferring electrode 1330, for instance, at about 50 to 25 μm. In addition, in this case, the auxiliary electrode 1320 can be also constituted with ink-philic conductors as mentioned above, and then, the auxiliary electrode 1320 part can be constituted so as to have an ink-repellent property substantially by coating an anti-outflow coating agent of water- and oil-repellent property as mentioned above on the surface thereof.

On the other hand, the transferring electrodes 1330 are constituted in such a manner that ink-philic conductors are located and attached between the above-mentioned auxiliary electrodes 1320, and the width of conductive part thereof is determined in relation to the arrangement pitch of the above-mentioned auxiliary electrodes 1320, for instance, determined at about 130 to 50 μm. Accordingly, considering that the arrangement pitch of the above-mentioned auxiliary electrodes is 3 to 8 lines/mm, the width of the dielectric substance substrate 1310 isolating the above-mentioned electrodes 1320 and 1330 from one another is selected at, for instance, 50 to 25 μm. Thus it is desirable that the width of the conductive part of the auxiliary electrode 1320 is selected at a value narrower than that of the transferring electrode 1330 substantially to dominantly control the amount of ink deposit. By such selection, a preferable configuration is obtainable for increasing the ink density in making an ink transfer recording.

Thus, as shown in the figure, the auxiliary electrodes 1320 are connected to the signal voltage source 1600 in common, and the ON control voltage $V_C$ and the OFF control voltage $V_C'$ are applied selectively as signal voltage to the transferring electrodes 1330 from the signal voltage source 1600 through the respective brush electrodes 1610.

Hereinafter, operation is elucidated in reference to the case where an oil ink making an electroosmotic travelling in the direction toward a negative electrode as mentioned above is used for the fluid ink 1200.

In the figure, when the ink transfer body 1300 is rotated as shown by the arrow mark in the figure, the fluid ink 1200 is deposited on the surface in contact with the fluid ink 1200, and the so-called wet front 1210 is formed at the portion where the surface 1201 of the ink 1200 and the surface of the transfer body 1300 intersect.

At this wet front 1210, the fluid ink 1200 is repelled and difficult to be deposited on the auxiliary electrode 1320 due to its ink-repellent property. However, on the transferring electrode 1330, the fluid ink 1200 is deposited due to its ink-philic property.

Now, as shown in the figure, when the ON control voltage $V_C$ positive with respect to the auxiliary electrode 1320 is applied as a signal voltage, the fluid ink 1200 deposited on the dielectric substance substrate 1310 and the transferring electrodes 1330 at this wet front 1210 moves from the transferring electrode 1330 side which is a positive electrode to the auxiliary electrode 1320 side which is a negative electrode side as exemplified by the arrow marks in the figure by means of electroosmotic travelling through the surface of dielectric substance substrate 1310. This moved fluid ink 1200 is concentrated in the vicinity of the auxiliary electrode 1320, but cannot stay on this electrode 1320 due to its ink-repellent property, and flows back into the ink bath 100 through the wet front 1210.

Therefore, the amount of the fluid ink 1200 deposited on the surfaces of the transferring electrode 330 and the dielectric substance substrate 1310 at the wet front 1210 whereto the ON control voltage $V_C$ is applied, that is, substantially on the surface of the transfer body 1300 at this portion is so controlled as to be reduced in proportion to the amplitude of the ON control voltage $V_C$ to be applied, and further in proportion to the product of amplitude and pulse width in the case of pulse-shaped $V_C$, and when these values are sufficiently large, no deposit of the fluid ink 1200 is produced.

On the other hand, as exemplified in the figure, at the wet front 1210 whereto the OFF control voltage $V_C'$ negative with respect to the auxiliary electrode 1320 is applied as a signal voltage, the fluid ink 1200 makes an electroosmotic travelling from the auxiliary electrode 1320 side which is a positive electrode onto the transferring electrode 1330 which is a negative electrode through the dielectric substance substrate 1310, and the amount of the ink 1200 deposited substantially on the surface of the transfer body 1300 at this portion is increased.

Thus, when the ink transfer body 1300 is rotated in synchronization with the application of the ON control voltage $V_C$ and OFF control voltage $V_C'$ which are signal voltages, the wet front 1210 relatively moves on the surface of the ink transfer body 1300, and also the amount of deposited ink 1200 is so controlled as to be reduced or increased corresponding to the signal voltages $V_C$ and $V_C'$ respectively.

However, with the rotation of the ink transfer body 1300, the fluid ink 1220 deposited on the surface of the dielectric substance substrate 1310 of the electrode 1330 sometimes flows down, deviates or diffuses along the surface of the ink transfer body 1300 due to its viscosity and gravity.

To prevent such troubles, horizontal stripes 1340 of insulating ink-repellent such as, for instance, the above-mentioned fluorine series polymer or the like are coated with an arrangement pitch nearly equal to that of the above-mentioned auxiliary electrodes 1320, for instance, 3 to 8 lines/mm, with a thin width of about 25 to 50 μm, and in parallel grating shape.

Thus, one unit area 1350 surrounded by the ink-repellent belts adjoining to one another 1340 and the ink-repellent auxiliary electrodes 1320 adjoining to one another (hatched area in the figure) forms one picture element. (When the ink-repellent 1340 is coated onto the entire surface of the dielectric substance substrate this picture element is limited to the surface of the transferring electrode 1330).

The amount of fluid ink 1220 deposited on this picture element 1350 is controlled in relation to $V_B$ and $V_B'$ when contacting with the wet front 1210, and when it leaves the wet front 1210 by the rotation of the ink transfer body 1300, the above-mentioned flowing-down, deviation or diffusion is limited within the picture element 1350 which is an independent area due to the ink-repellent property of the surroundings, and flowing-out or diffusion to other picture elements does not take place. Therefore, an electroosmotic travelling of the deposited ink 1220 is limited within the picture element itself even if $V_C$ and $V_C'$ are applied, and the amount of the ink 1220 deposited within the picture element 1350, that is, on the surface of the ink transfer body 1300 is determined by $V_C$ and $V_C'$ when the picture element passes through the wet front 1210, and when the picture element leaves the wet front, the amount of ink can no longer be controlled.

Thus, by rotating the ink transfer body 1300, the amount of ink 1220 deposited within each picture element 1350 is determined in a line sequential manner corresponding to the signal voltages $V_C$ and $V_{C'}$, thereby the amount of ink deposited on the surface of the ink transfer body 1300 is controlled in a two-dimensional fashion.

the recording medium 1500 through the press contact roller 1400, and by this transferred ink 1230, an ink picture corresponding to signal voltage to be applied is recorded and reproduced on the surface of the recording medium 1500.

Normally, a suitable maximum amplitude of the ON control voltage $V_C$ is about 2 V per μm of the length between the electrodes 1320 and 1330, that is, of the width of dielectric substance substrate 1310 sandwiched inbetween, based on the insulating strength of the fluid ink 1200 to be used. That is, even at maximum, the amplitude is as low as several hundreds volts across terminals. The amplitude modulation, pulse-width modulation, or pulse-width amplitude modulation is performed depending upon input information within this voltage range, thereby not only the ON-OFF (that is, binary) recording but also the gray scale recording can be carried out. Note that, in this example, printing is white at the ON voltage and black at the OFF voltage.

On the other hand, the OFF control voltage $V_C'$ is also modulated by input information like the abovementioned, thereby control can also be made so as to increase the amount of deposited ink 1220. However in such case, to avoid a trouble that a pattern not corresponding to input signal is formed due to drop-fall or the like as a result of excessive ink 1200 deposited at the wet front 1210 by means of electroosmotic travelling when an excessive OFF control voltage $V_C'$ is applied, the OFF control voltage $V_C'$ is selected at a constant voltage with amplitude of as small as about one-tenth the maximum amplitude without modulation by input information only to aid a natural deposit by the wetting of the fluid ink 1200 at the wet front 1210, thereby operation can be stabilized.

Furthermore, in this case, when the ink deposited at the wet front 1210 is sufficient, the circuit configuration of the signal voltage can also be simplified by selecting the amplitude of the OFF control voltage $V_C'$ to zero.

In addition, to make a stable and good recording, it is desirable that the ink transfer body 1300 is rotated in synchronization with the signal voltage so that $V_C$ and $V_C'$ will be applied at a time when the picture element 1350 is positioned correctly at the wet front.

However, a sufficiently large ON control voltage $V_C$ is applied all the time so that the ink 1220 will not be deposited within the picture element 1350, and the OFF control voltage $V_C'$ is applied only during recording, thereby an advantage is obtained that a clear and crisp ink picture can be recorded without so much consideration on the above-mentioned synchronization. Furthermore, when the transferring electrode 1330 is formed in a narrow shape like the auxiliary electrode 1320 and also constituted so as to have ink-repellent property substantially, the amount of ink deposited on the surface of the dielectric substance substrate 1310 can be reduction-controlled corresponding to the applied signal voltage irrespective of polarity which is modulated by input information, thereby an ink recording can be simply made likewise.

In addition, in the present embodiment, the ink transfer body 1300 is constituted by installing the electrodes 1320 and 1330, and the ink-repellent 1340 on a cylinder- or column-shaped dielectric substance substrate, however, a column- or cylinder-shaped ink transfer body 1300 can also be formed in such a manner that the electrodes 1320 and 1330, and the dielectric substance substrate 1310 are made in a disk- and doughnut plate shapes of predetermined thicknesses respectively, and a plural number of them are adhered.

Particularly when the ink transfer body is formed in a cylinder shape as mentioned above, an advantage is given that voltages can be applied from the inside of cylinder to the auxiliary electrodes 1320 and the transferring electrode 1330 by means of brush electrode or the like.

Figure 6:
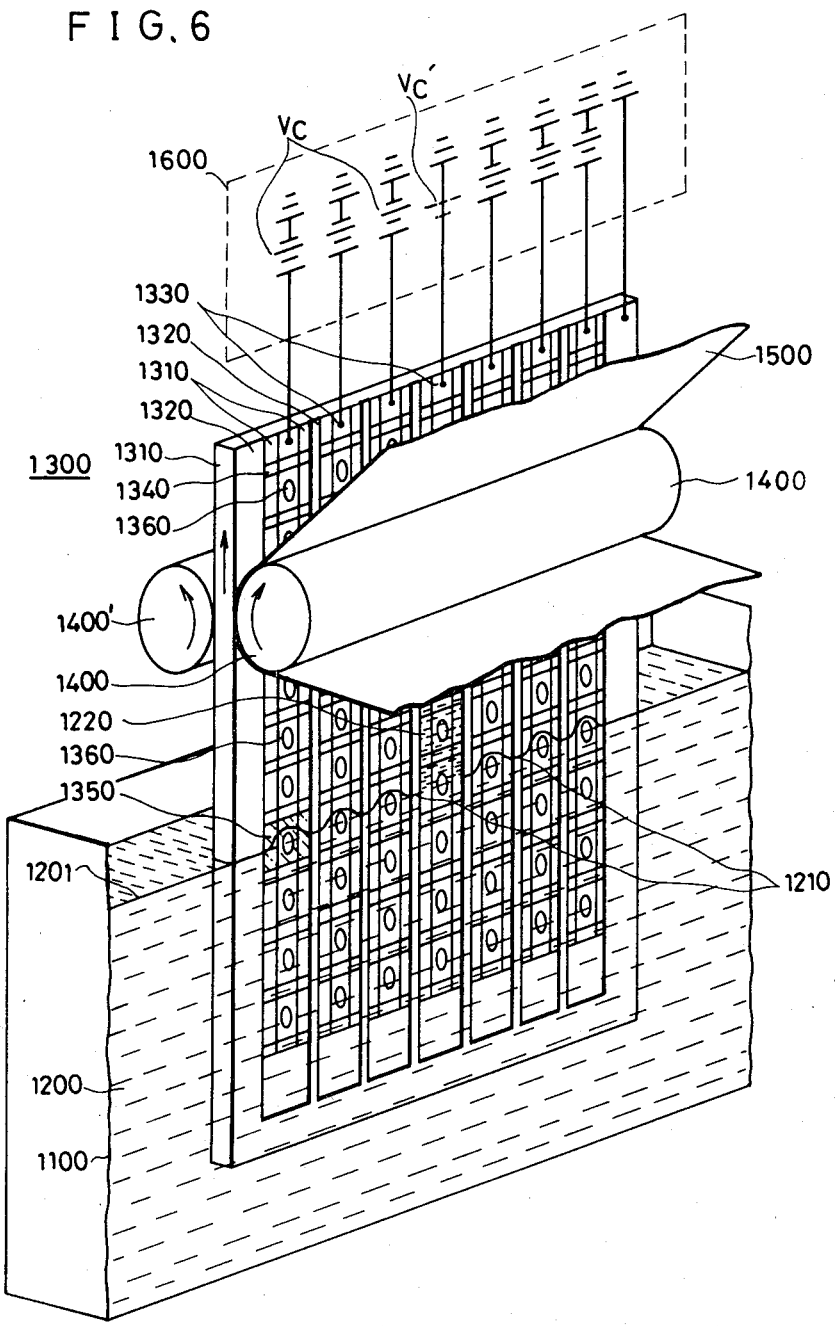
FIG. 6 is a view showing a perspective fragmental structure and a power supplying system of a recording apparatus of the sixth embodiment in accordance with the present invention.

FIG. 6 is a view showing a perspective fragmental structure and a power supplying system of the sixth embodiment of a recording apparatus in accordance with the present invention.

This embodiment is a case where the concentration of ink recording in the case of FIG. 5 is improved, and shows one example of plate-shaped ink transfer body.

A plate-shaped dielectric substance substrate 1310 is employed, and the ink-repellent auxiliary electrodes 1320, the ink-philic transferring electrodes 1330, and the horizontal stripes of ink-repellent 1340 are installed on the surface thereof in such a manner that the ink transfer body in FIG. 5 having a cylindrical surface is substantially developed in a plane shape.

In this embodiment, to improve the ink concentration when an ink recording is made on the recording medium 1500, a dot-shaped dent 1360 of about 10 to 40 μm in depth is provided on the transferring electrode 1330 within each picture element 1350. This dent 1360 may penetrate the transferring electrode 1330, intruding into the solid state dielectric substance substrate 1310, or the conductive part of the transferring electrode 1330 may be formed by means of plating or evaporation on the wall surface of this dent 1360. Furthermore, the ink-repellent 1340 of insulating property can be coated entirely except for the above-mentioned dents 1360. The auxiliary electrodes 1320 and the transferring electrodes 1330 are connected to the signal voltage source 1600 respectively, and signal voltage is applied selectively across the auxiliary electrode 1320 and each transferring electrode 1330.

Next, operation is elucidated in reference to the case where the fluid ink 1200 making an electroosmotic travelling in the direction toward a negative electrode is used like the case in FIG. 5. At the part immersed into the fluid ink 1200 in the ink bath 1100, the fluid ink 1200 is deposited on the surface of the ink transfer body 1300 including the dents 1360. At the wet front 1210, and further within the picture element 1350 having the transferring electrode 1330 whereto the ON control voltage $V_C$ large enough and positive with respect to the auxiliary electrode 1320 is applied, the fluid ink 1200 deposited on the respective surfaces of the dielectric substance substrate 1310 and the transferring electrode 1330, and deposited in the dent 1360 moves to the auxiliary electrode 1320 side by means of electroosmotic travelling with respect to the dielectric substance substrate 1310, and flows back into the ink bath 1100 through the wet front 1210 due to the ink-repellent property of the auxiliary electrode 1320.

On the other hand, at the transferring electrode whereto zero voltage (which is one example of the OFF control voltage) is applied, the above-mentioned electroosmotic travelling does not take place, and the ink 1220 deposited within the dent 1360 and the picture element 1350 moves upward by rotations of the press contact rollers 1400 and 1400' as shown by the arrow marks, thereby a two-dimensional distribution of the deposited ink 1220 can be formed on the surface of the ink transfer body 1300 corresponding to signal voltage.

The controlled deposited ink 1220 is prevented from flowing-out or diffusion due to the ink-repellent property of the auxiliary electrode 1320 and the horizontal stripes of ink-repellent 1340, and remains within the picture element.

Thus, such controlled deposited ink 1220 is transferred onto the recording medium by means of press rollers 1400, thereby an ink picture can be recorded and reproduced corresponding to signal voltages (plural) applied across the auxiliary electrode 1320 and the transferring electrodes 1300.

In the embodiment of FIG. 5, due to the configuration of controlling the ink 1220 deposited on the surface of even (dent-less) picture element 1350, the amount of deposited ink 1220 is small, and sometimes no sufficient ink concentration is obtainable.

However, in the present embodiment, the dents 1360 are provided to utilize the ink deposited in these dents, thereby the amount of ink deposited within the picture element is sufficiently obtainable, so that an advantage is given that an ink transcription of high concentration can be carried out.

Furthermore, in the present embodiment, one dent 1360 is provided within a unit picture element 1350, however, the ink concentration can be further improved by providing plural dents at the transferring electrode 1330 part, or by further providing a singular or plural dents on the surface of the dielectric substance substrate 1310. In addition, the transferring electrode 1330 is formed in a narrow shape like the auxiliary electrode 1320 and is given an ink-repellent property, and the dent is provided at the dielectric substance substrate 1310 part like the above-mentioned, and the amount of this deposited ink is reduction-controlled by means of signal voltage application, thereby an ink recording can also be carried out.

Thus, after transferring the ink 1220 deposited on the surface of the ink transfer body 1300 onto the recording medium 1500, the recording medium 1500 is parted from the surface of the ink transfer body 1300, and the ink transfer body 1300 is immersed again into the fluid ink 1200 in the ink bath 1100, thereby an ink picture recording can be made again like the above-mentioned.

Furthermore, the ink transfer body 1300 of the shape as shown in FIG. 6 can also be formed in the present embodiment in such a manner that the auxiliary electrode 1320, the transferring electrode 1330 and the dielectric substance substrate 1310 are formed in a longitudinal stripe shape respectively, and are placed in parallel, and adhered to one another.

Figure 7:
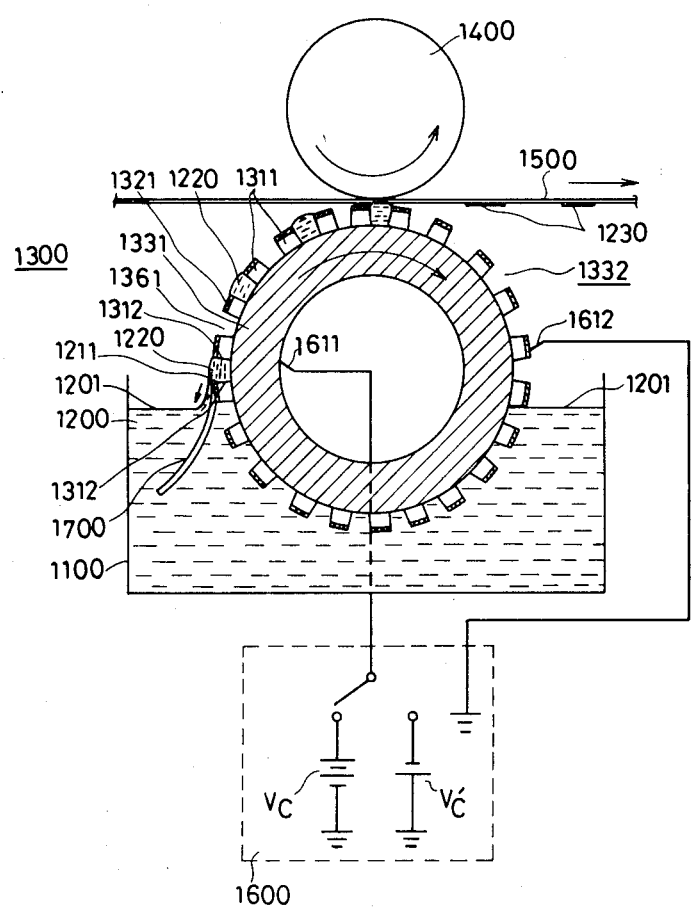
FIG. 7 is a view showing a cross-sectional structure and a power supplying system of the seventh embodiment of a recording apparatus in accordance with the present invention.

FIG. 7 is a view showing a cross-sectional structure and a power supplying system of the seventh embodiment of a recording apparatus in accordance with the present invention.

In this embodiment, a transferring electrode 1331 comprises thin doughnut-shaped metal disks constituting a cylindrical accumulated body 1332 in such a manner that plural pieces thereof are adhered to one another, or further adhered to one another with an insulator spacer sandwiched inbetween, in the direction perpendicular to the sheet face of the drawing with an adhesive of insulating property, thereby insulated from one another. Each metal disk is connected to the signal voltage source 1600 through a brush electrode 1611 (the brush electrodes 1611 are also provided in the direction perpendicular to the sheet face), and signal voltage is applied selectively to each transferring electrode 1331.

The dielectric substance substrate 1311 is coated over the entire surface of the above-mentioned accumulated body 1332 in a uniform and thin fashion, and the dot-shaped dents 1361 with uniform opening diameter and uniform depth, that is, independent parts forming picture elements are arranged regularly at the part located on the peripheral surface of the above-mentioned plural transferring electrodes 1331. In addition, to stabilize the operation by contacting respective dents simultaneously with the wet front 1211, the above-mentioned respective dents 1361 are desirably arranged in a linear fashion horizontally in the direction perpendicular to the drawing sheet face.

On the surface of the above-mentioned dielectric substance substrate 1311, auxiliary electrodes 1321 substantially ink-repellent against the fluid ink 1200 to be used are coated uniformly with the above-mentioned dents 1361 left uncoated. The auxiliary electrodes 1321 are connected to the signal voltage source 1600 through the brush electrodes 1612.

The ink transfer body 1300 as mentioned above is immersed into the fluid ink 1200 in the ink bath 1100, thereby the wet front is formed, however, in this case, the ink surface 1201 sometimes sways due to rotation of the ink transfer body 1300, thereby the wet front is vibrated, or the fluid ink 1200 is deposited in excess on the surface of the ink transfer body 1300, making the operation unstable.

Then, in the present embodiment, the end edge part linear in the direction perpendicular to the sheet face of a front forming body 1700 (a kind of doctor blade) such as thin sheet, film or the like of porous substance or non-porous substance is arranged in such a manner that the end edge part contacts with the surface of the ink transfer body 1300 at the same level as or a little higher level than this ink surface 1201, or draws near it with an appropriate gas kept. The other end part of the front forming body 1700 is immersed into the fluid ink 1200 in the ink bath 1200.

Thus, by the presence of the front forming body 1700, the excessive ink deposited on the surface of the ink transfer body 1300 in the ink bath 1100 is scraped off by the doctor blade effect of the end part of the front forming body 1700, thereby being unified.

The width of the transferring electrode 1331 (in the direction perpendicular to the sheet face) determines the resolution of ink recording. Accordingly, to make a normal ink recording of about 3 to 8 lines/mm, the accumulated body 1322 is formed with an arrangement of the transferring electrodes 1331 corresponding to this density. As to the conduction width of the transferring electrode 1331, ink-philic conductors of about 300 to 100 $\mu$m in width are employed, and they are accumulated and adhered with an adhesive of insulating property such as $\alpha$-cyanometaacrylate or the like with an insulating space such as, for instance, polyethyl film or the like sandwiched inbetween, as required. Furthermore, when the dielectric substance substrate 1311 is of ink-philic property, the transferring electrode 1331 can be constituted so as to have an ink-repellent property.

For the fluid ink 1200 as described in FIG. 1, the dielectric substance substrate 1311 is formed with a thin film of, for instance, plastic such as cellulose acetate or the like, glass material or the like, and the thickness thereof is selected at, for instance, about 10 to 40 $\mu$m so that the depth of the dent 1361 will be appropriate. The depth of the dent 1361 can be determined in such a manner that the surface of the transferring electrode 1331 is exposed, or the dent 1361 reaches the surface of the electrode 1331 or intrudes into the inside thereof, and for instance, selected at about 10 to 40 $\mu$m.

Preferably, one dent 1361 is located per unit width of the transferring electrode 1331, or a plural number of dents can be located when this width is wide.

The auxiliary electrode 1321 is coated with the above-mentioned ink-repellent conductor by means of evaporation, plating or the like, and is etched together with the above-mentioned dielectric substance substrate 1311 by means of the photoetching method known to the public, thereby the dent 1361 can be formed. Or the dent 1361 is formed by etching the surface of the dielectric substance substrate 1311, thereafter graphite conductive paint, and further the ink-repellent are coated selectively on the surface of the dielectric substance substrate 1311 except for the dent 1361 part, thereby the auxiliary electrode 1321 can also be constituted.

Thus, when, for instance, the fluid ink 1200 making an electroosmotic travelling in the direction toward a negative electrode is used, the wet front 1211 staying at a constant position independent of vibration of the ink surface 1201 is formed at the end part of the front forming body 1700 by the doctor blade effect thereof. When the ON control voltage $V_C$ is applied to the transferring electrode 1331, the deposited ink 1220 makes an electroosmotic travelling in the direction toward the auxiliary electrode 1321, that is, as shown by the arrow mark, and the front forming body 1700 through a dielectric substance wall 1312 in the dent 1361, and then flows back into the ink bath 1100, thereby the fluid ink 1220 deposited in the dent 1361 is reduced.

On the other hand, when the OFF control voltage $V_C'$ is applied to the transferring electrode 1331, the electroosmotic travelling is made in the reverse direction to the above-mentioned, thereby the above-mentioned back-flowing of ink is prevented and fully deposited ink 1200 is obtained in the dent 1361.

This controlled deposited ink 1220 is transferred onto the recording medium 1500 with the rotation of the ink transfer body 1300, and after once leaving the wet front 1211, diffusion or deviation of deposited ink 1220 from respective dents 1361 is prevented due to a substantial ink-repellent property of the auxiliary electrode 1321. Accordingly, an ink transcription 1230 corresponding to the signal voltages $V_C$ and $V_C'$ is obtainable on the recording medium 1500.

The front forming body 1700 may be flexible or non-flexible, however, from the standpoint of preventing a damage on the surface of the ink transfer body 1300, a flexible substance is preferable such as film of cellulose acetate, polyester or the like, porous substance such as microporous membrane filter or the like. A non-flexible substance with sharp tip such as glass plate, plastic plate or the like are preferable from the standpoint of the doctor blade effect, but sometimes injures the surface of the ink transfer body 1300, therefore in this case, the front forming body can be installed while parting a little from the surface of the ink transfer body 1300.

Thus, in the front forming body 1700 impregnated or deposited with the fluid ink 1200 in the ink bath 1100 forms the stable wet front 1211, however, the wet front 1211 can also be formed likewise by impregnating, depositing, and feeding the fluid ink directly into the front forming body 1700 from an external ink feeding apparatus, and a stable operation can be carried out. In such case, the ink transfer body 1300 as shown in the present embodiment is not required to be immersed into the fluid ink 1200 in the ink bath 1100, and the above-mentioned ink feeding apparatus newly installed can be substituted for.

Furthermore, installations of the above-mentioned front forming body and further the external ink feeding apparatus are applicable likewise to the embodiments of FIGS. 5 and 6.

In the present embodiment, the auxiliary electrodes 1321, the dielectric substance substrates 1311 and the transferring electrodes 1331 are accumulated in the direction perpendicular to the sheet face, so that the arrangement density of the transferring electrodes 1331 is far more dense unlike the cases of FIGS. 5 and 6, therefore an ink recording of high resolution and high contrast can be carried out by combining with the installation of the dents 1361.

Elucidation is made above on the operation in reference to the fluid ink making an electroosmotic travelling in the direction toward a negative electrode, and in the case of fluid ink making an electroosmotic travelling in the direction toward a positive electrode, operation can be carried out likewise by reversing the polarity of signal voltage in the above-mentioned case.

Furthermore, the auxiliary electrode, the dielectric substance substrate, and the transferring electrode can be constituted so as to have either of ink-repellent and ink-philic properties respectively as required, not to limited to the above elucidation.

In addition, configuration can be made without an ink-repellent as required.

Furthermore, in this elucidation, signal voltage is applied selectively to the transferring electrode with the auxiliary electrode taken as a standard, however, signal voltage may be applied selectively to the auxiliary electrode with the transferring electrode taken as a standard, for instance, in the case of FIG. 7 or the like, by dividing the auxiliary electrodes into plural groups if required.

A modification may be made such that the oil-repelling stripes 1340 are made tilted from those of FIGS. 5 and 6.

Furthermore, by using a non-colored or colorless liqueous substance making an electroosmotic travelling in place of the fluid ink, transcription is made likewise onto the recording medium, thereafter a coloring matter such as dye, pigment or the like is adhered to or dissolved into this transferring liqueous material, thereby the liqueous material is colored or develops color, or a substance capable of developing color is coated in advance on the recording medium, and then color is developed by means of transcription of the above-mentioned liqueous material. By employing either of the above-mentioned means, a substantial ink recording with light and shade can be carried out.

Furthermore, a plural number of apparatuses in accordance with the present invention are arranged, and the fluid inks of cyan, magenta, yellow, black and the like are used respectively for them, thereby a color printer superseding the conventional gravure printing can be constituted.

In addition, the above-mentioned various configurations and descriptions can be put into practice by conveniently combining them as required.

As mentioned above, the recording apparatuses in accordance with the present invention are of low voltage and simple in comparison with the ink-flying recording apparatus of coulomb force method, and by the present invention, wear-out of the recording head and deterioration of resolution as experienced in the conventional recording apparatus of direct transfer method are improved, so that an ink picture of good contrast and high resolution can be simply recorded and reproduced.

Thus the apparatuses in accordance with the present invention are very useful for the industries.

What is claimed is:

1. An ink recording apparatus comprising:
    an ink transfer body for holding fluid ink thereon,
    an ink feeding means for feeding fluid ink to said ink transfer body,
    a driving means for driving said ink transfer body with respect to said ink feeding means,
    a means to control amounts of said fluid ink brought onto parts of said ink transfer body by means of electroosmotic travellings of said fluid ink by means of electric signals, and
    a means for transferring ink pattern held on said ink transfer body onto a recording face of a recording medium thereby to record ink pattern corresponding to said electric signal.

2. An ink recording apparatus in accordance with claim 1, which further comprises:
    a recording electrode,
    a dielectric substance member disposed between said ink transfer body as a transfer electrode and said recording electrode, thereby forming path of said electroosmotic travelling,
    a signal impressing means to impress said electric signal across said ink transfer body and said recording electrode, thereby to induce said electroosmotic travelling.

3. An ink recording apparatus in accordance with claim 2, wherein said signal impressing means impresses said electric signal in a manner to increase said electroosmotic travelling for increasing ink density of a picture element.

4. An ink recording apparatus in accordance with claim 2, wherein said signal impressing means impresses said electric signal to increase said electroosmotic travelling for decreasing ink density of a picture element.

5. An ink recording apparatus in accordance with claim 2, wherein
    said ink transfer body has at least a transfer electrode of conductive material at least on the surface thereof,
    said dielectric substance member has an edge part which is slidably disposed with a predetermined small gap to said transfer electrode,
    said recording electrode is disposed apart and isolated from said transfer electrode,
    at least either of said transfer electrode and said recording electrode consists of a plurality of each other isolated element electrodes, to which individual components of said electric signal are to be impressed.

6. An ink recording apparatus in accordance with claim 5, which further comprises:
    a means for feeding said fluid ink disposed at the side where said recording electrodes are installed of said dielectric substance member, and
    a signal impressing means which selectively impresses an ON voltage signal modulated by input information which causes said fluid ink to travel electroosmotically through said dielectric substance member to feed and deposit said fluid ink onto said ink transfer body, and an OFF voltage signal which stops or prevents said electroosmotic travelling.

7. An ink recording apparatus in accordance with claim 5, which further comprises:
    a means for coating said fluid ink on said ink transfer body surface and equalizing coating amount thereof, and said signal impressing means impresses said ON voltage signal component modulated by input information which causes this equalized coated fluid ink to travel electroosmotically through said dielectric substance member and controls said fluid ink to attract toward said recording electrode from said ink transfer body surface, and impresses said OFF signal voltage component which stops or prevents said electroosmotic travelling.

8. An ink recording apparatus in accordance with claim 6 or 7, wherein said ON voltage signal component and said OFF voltage signal component are in a relation of reverse polarity, and the amplitude or pulse width of said OFF voltage signal component is selected at a constant value.

9. An ink recording apparatus in accordance with claim 5, wherein said ink transfer body is a column- or cylinder-shaped rotary body comprising a conductive substance, and said recording electrode comprises a plural number of electrodes insulating from one another, and said rotary body is to be rotated in synchronization with said signal voltages in a predetermined relationship, thereby the amount of said fluid ink deposited on this rotary body surface is controlled in a two-dimensional fashion by means of said signal voltages.

10. An ink recording apparatus in accordance with claim 5, wherein said ink transfer body is a rotary body comprising an ink-philic column- or cylinder-shaped conductive substance which gets wet with said fluid ink, and an ink-repellent coating for repelling said fluid ink of insulating or conductive property which is coated to form a plural number of dot-arrangement-shaped ink accommodating parts wherethrough said conductive substance is exposed to the surface thereof, and said dielectric substance member is installed so as to contact partly with said rotary body surface, and said recording electrode comprises a plural number of electrodes insulated from one another, and said signal voltages are impressed selectively across each recording electrode and said rotary body, and said rotary body is rotated in synchronization with said signal voltages, thereby said amount of fluid ink deposited at each said dot-shaped ink accommodating part of said rotary body is controlled.

11. An ink recording apparatus in accordance with claim 10, wherein etched dot-shaped dents with nearly equal diameter and depth are formed on the surface of said column- or cylinder-shaped conductive substance at respective said dot-arrangement-shaped ink accommodating parts.

12. An ink recording apparatus in accordance with claim 10, wherein the arrangement pitch of said plural number of recording electrodes is selected at a value equal to or integer-fold of the arrangement pitch of said dot-arrangement-shaped ink accommodating parts.

13. An ink recording apparatus in accordance with claim 5, wherein said ink transfer body is a cylindrical rotary body, comprising on said rotary body surface, a plural number of transferring electrodes of conductive substance, thin in the direction parallel to the axis of said rotary body, and arranged in the longitudinal direction of said rotary body, in an insulated relation from one another by means of insulators alternately disposed inbetween, said signal voltages being impressed selectively across each said transferring electrode and said recording electrode, said rotary body being rotated in synchronization with said signal voltages, thereby to control the amount of fluid ink deposited on said rotary body surface in a two-dimensional fashion by means of said signal voltages.

14. An ink recording apparatus in accordance with claim 13, wherein said rotary body is constituted by adhering said disk shaped thin conductors and insulators to each other alternately.

15. An ink recording apparatus in accordance with claim 13, wherein said surface of transferring electrode of said rotary body surface is constituted in such a manner that ink-repellent insulating parts of substantially stripe shaped are provided in a direction parallel to the axis of said rotary body at a constant interval, and circumpherential parts of said surface of insulators are also constituted so as to repel said fluid ink.

16. An ink recording apparatus in accordance with claim 13, wherein a plural number of ink accommodating parts comprising dot-shaped dents of nearly uniform diameter and depth are installed in the circumferential direction at a substantially constant interval.

17. An ink recording apparatus in accordance with claim 9 or claim 13, having a means wherein a press contact roller is installed corresponding to a rotary body forming said ink transfer body, and a recording medium is disposed between said rotary body and said press contact roller, thereby said fluid ink, whose deposited amount is controlled in said two-dimensional fashion, is transferred to be deposited onto said recording medium surface from said rotary body surface.

18. An ink recording apparatus in accordance with clamim 5, wherein, said dielectric substance member ia a flexible dielectric substance member, and one face of one end part thereof is in contact with said ink transfer body, and said recording electrodes are provided on the other face of said flexible dielectric substance member, thereby inducing electroosmotic travellings of said fluid ink on an end edge face of said one end part and further through said flexible dielectric substance substrate in the thicknesswise direction thereof.

19. An ink recording apparatus in accordance with claim 18, wherein said flexible dielectric substance member is a porous dielectric substance member having pores or gaps which substantially penetrate in the direction of thickness, and said recording electrodes are constituted so as to be permeable to said fluid ink.

20. An ink recording apparatus in accordance with claim 18, wherein the surface of said dielectric substance member opposite to the surface whereon said recording electrodes are coated is supported with a supporting substrate of insulating property with a part contacting with said ink transfer body left, and said supporting substrate is that which causes said fluid ink to travel electroosmotically in the same polarity relation for voltage as that of said flexible dielectric substance member.

21. An ink recording apparatus in accordance with claim 5, wherein said dielectric substance member is a porous substance member having pores or gaps which penetrate substantially in the direction of thickness, and said porous dielectric substance member is held on a supporting substrate of insulating property on the surface of which said recording electrodes are provided, and one end part side of said porous dielectric substance member is brought almost in contact with said ink transfer body surface, and said porous dielectric substance member and said supporting substrate of insulating property cause said fluid ink to travel electroosmotically in the same polarity of voltage.

22. An ink recording apparatus in accordance with claim 5, wherein said dielectric substance member is disposed at an acute angle with respect to a surface tangential to said ink transfer body at a contacting line, and a means is provided for rotating said ink transfer body in the angular direction opposite to said acute angle side in synchronization with said signal voltages impressed across said recording electrode and said transferring electrode.

23. An ink recording apparatus in accordance with claim 1, wherein
said ink transfer body has a predetermined number of sets each comprising a transfer electrode of conductive substance, an auxiliary electrode of conductive substance and a dielectric substance member disposed inbetween and insulating them from each other, said transfer electrode and said auxiliary electrode exposing selected parts thereof at the surface of said ink transfer body, and
the apparatus further comprises
an ink feeding means for feeding said fluid ink to said ink transfer body in a manner to form a wet front of said fluid ink which is movable with respect to said ink transfer body, and
a signal impressing means to impress said electric signal across said transfer electrode and said auxiliary electrode, thereby to induce said electroosmotic travelling therebetween.

24. An ink recording apparatus in accordance with caim 23, which further comprises
ink isolation means for preventing dispersion or diffusion of said fluid ink from selected spots whereto said fluid ink is driven by said electroosmotic travellings, and
a means for controlling said driving means in a predetermined synchronized relation with said electric signal, thereby to move said wet front in said synchronized relation with said electric signal.

25. An ink recording apparatus in accordance with claim 24, having an ink transfer body having two-dimensional surface on plate, column- or cylinder-shapes wherein said auxiliary electrodes and said transferring electrodes, being isolated from one another by means of said solid state dielectric substance member, are arranged alternately on the face and at least the surfaces part of said auxiliary electrode and said transferring electrodes have ink-repellent parts to repel said fluid ink substantially, and also said surface part comprises ink repelling stripe parts for repelling said fluid ink and disposed substantially in a manner to cross said dielectric substance member at a nearly uniform intervals intersecting said auxiliary electrodes and said transferring electrodes, thereby forming each-other-isolated picture elements whereon said fluid ink can be deposited substantially are provided on the surface.

26. An ink recording apparatus in accordance with claim 25, wherein dents for accommodating said fluid ink are provided on the surface parts located at said each-other-isolated picture elements of at least either of said transferring electrodes and the exposed surface part of said dielectric substance member.

27. An ink recording apparatus in accordance with claim 24, wherein said ink transfer body of any one of plate, column, and cylinder shapes is provided in such a configuration that said auxiliary electrodes and said transferring electrodes are arranged alternately on one plane while isolated from one another by means of said solid state dielectric substance member, and said each-other-isolated picture elements are formed on the surface of said transferring electrodes disposed in the extending directions of said plural electrodes, and the other of surface of said ink transfer body are constituted to repel said fluid ink.

28. An ink recording apparatus in accordance with claim 27, wherein a dent for accommodating said fluid ink is provided on the surface part located at said each-other-isolated picture element of said transferring electrode.

29. An ink recording apparatus in accordance with claim 24, wherein on said ink transfer body said auxiliary electrode is located on one face side of said dielectric substance member and a singular or plural said transferring electrodes insulated from one another are arranged on the other face side of said dielectric substance member to form accumulated body, the outer surface of said auxiliary electrode surface forming said accumulated body having substantially repelling nature to said fluid ink, and said independent dents formed by intruding inside from said surface from said auxiliary electrode surface through said dielectric substance member forming fluid ink acommodating dents said electeic signal voltages being to be impressed selectively across said auxiliary electrode and said transferring electrode.

30. An ink recording apparatus in accordance with claim 24, 25, 27, or 29, wherein said ink transfer body has a plural number of transferring electrodes arranged insulated from one another and parallel each other, and said wet front is formed in such a relation to intersect with the extending direction of said transferring electrodes, and a means for moving said ink transfer body with respect to said wet front is constituted to move said ink transfer body in the direction that substantially said transferring electrode extends.

31. An ink recording apparatus in accordance with claim 30, wherein said ink transfer body is partly immersed into said fluid ink in an ink bath, and said wet front is formed by bringing said fluid ink surface in contact with said ink transfer body surface.

32. An ink recording apparatus in accordance with claim 30, wherein said wet front is formed in such a manner that an end part of front forming body comprising a dielectric substance plate wherein said fluid ink is deposited or impregnated is disposed drawn near to or brought in contact with said ink transfer body surface, thereby to form said wet front.

33. An ink recording apparatus in accordance with claim 24, wherein a signal voltage impressed across said auxiliary electrode and said transferring electrode contains a signal voltage of a polarity for causing said fluid ink to travel electroosmotically from said transferring electrode to said auxiliary electrodes through said dielectric substance member, and the amount of ink deposited on said ink transfer body surface at said wet front is controlled by means of said signal voltage to be decreased from said ink feeding means to said transferring electrode through said auxiliary electrode and said dielectric substance member by an electroosmotic travelling.

34. An ink recording apparatus in accordance with claim 24, wherein a signal voltage impressed across said auxiliary electrode and said transferring electrode contains a signal voltage of a polarity for causing said fluid ink to travel electroosmotically from said auxiliary electrodes to said transferring electrode through said dielectric substance member, and the amount of ink deposited on said ink transfer body surface at said wet front is controlled by means of said signal voltage to be increased from said ink feeding means to said transferring electrode through said auxiliary electrode and said dielectric substance member by an electroosmotic travelling.

35. An ink recording apparatus in accordance with claim 24, wherein a signal voltage impressed across said auxiliary electrode and said transferring electrode contains an ON control voltage of a polarity for causing said fluid ink to travel electroosmotically from said transferring electrode to said auxiliary electrode through said dielectric substance member, and an OFF control voltage of polarity reverse to said ON control voltage.

36. An ink recording apparatus in accordance with claim 35, wherein both said ON control voltage and said OFF control voltage contain signal information to be ink-recorded.

37. An ink recording apparatus in accordance with claim 35, wherein said ON control voltage contains signal information to be ink-recorded, and said OFF control voltage is a voltage with a constant amplitude.

38. An ink recording apparatus in accordance with claim 36 or 37, wherein the amplitude of said OFF control voltage is selected at a value smaller than a maximum amplitude of said ON control voltage.

39. An ink recording apparatus in accordance with claim 24, wherein a bias voltage of a polarity for causing said fluid ink to travel electroosmotically from said transferring electrode to said auxiliary electrode side through said dielectric substance member is impressed across said auxiliary electrode and said transferring electrode, and a signal voltage which is of reverse polarity to said bias voltage and contains signal information is impressed in superposition to said bias voltage.

* * * * *